(12) United States Patent
Hou et al.

(10) Patent No.: US 8,265,138 B2
(45) Date of Patent: Sep. 11, 2012

(54) IMAGE PROCESSING APPARATUS, METHOD AND INTEGRATED CIRCUIT USED IN LIQUID CRYSTAL DISPLAY BY PROCESSING BLOCK VELOCITY OF NOISY BLOCKS

(75) Inventors: Pei-Lin Hou, Taipei County (TW); Chih-Jung Lin, Taipei County (TW)

(73) Assignee: Panasonic Corporation, Osaka (JP)

( * ) Notice: Subject to any disclaimer, the term of this patent is extended or adjusted under 35 U.S.C. 154(b) by 848 days.

(21) Appl. No.: 12/300,230

(22) PCT Filed: May 1, 2007

(86) PCT No.: PCT/JP2007/059786
§ 371 (c)(1),
(2), (4) Date: Feb. 4, 2009

(87) PCT Pub. No.: WO2007/132792
PCT Pub. Date: Nov. 22, 2007

(65) Prior Publication Data
US 2010/0014579 A1    Jan. 21, 2010

(30) Foreign Application Priority Data

May 12, 2006  (CN) .......................... 2006 1 0082676

(51) Int. Cl.
*H04N 7/12* (2006.01)

(52) U.S. Cl. ................................. 375/240.01
(58) Field of Classification Search ............ 375/240.01; H04N 7/12
See application file for complete search history.

(56) References Cited

U.S. PATENT DOCUMENTS

| | | | |
|---|---|---|---|
| 5,852,475 | A | 12/1998 | Gupta et al. |
| 5,920,356 | A | 7/1999 | Gupta et al. |
| 6,115,423 | A | 9/2000 | Shen et al. |
| 6,340,994 | B1 | 1/2002 | Margulis et al. |
| 2002/0141503 | A1 | 10/2002 | Kobayashi et al. |
| 2003/0112877 | A1 | 6/2003 | Lee et al. |
| 2004/0101050 | A1 | 5/2004 | Lee et al. |
| 2005/0074182 | A1 | 4/2005 | Lee et al. |
| 2005/0162566 | A1 | 7/2005 | Chuang et al. |

*Primary Examiner* — Y Lee
*Assistant Examiner* — Yulin Sun
(74) *Attorney, Agent, or Firm* — Greenblum & Bernstein, P.L.C.

(57) ABSTRACT

An image processing method, and an apparatus and an integrated circuit for implementing the method are adapted for use in a liquid crystal display. The method includes the steps of: determining which blocks in a decoded current frame are noisy blocks; finding, in a processed reference frame, a most similar reference block for each noisy block and generating a block velocity for each noisy block; and processing pixels that are in the noisy blocks having block velocities smaller than a liquid crystal response rate of the liquid crystal display, and that are not covered by after-images. The present invention utilizes the characteristics of liquid crystals to increase processing speed.

21 Claims, 7 Drawing Sheets

Fig.4

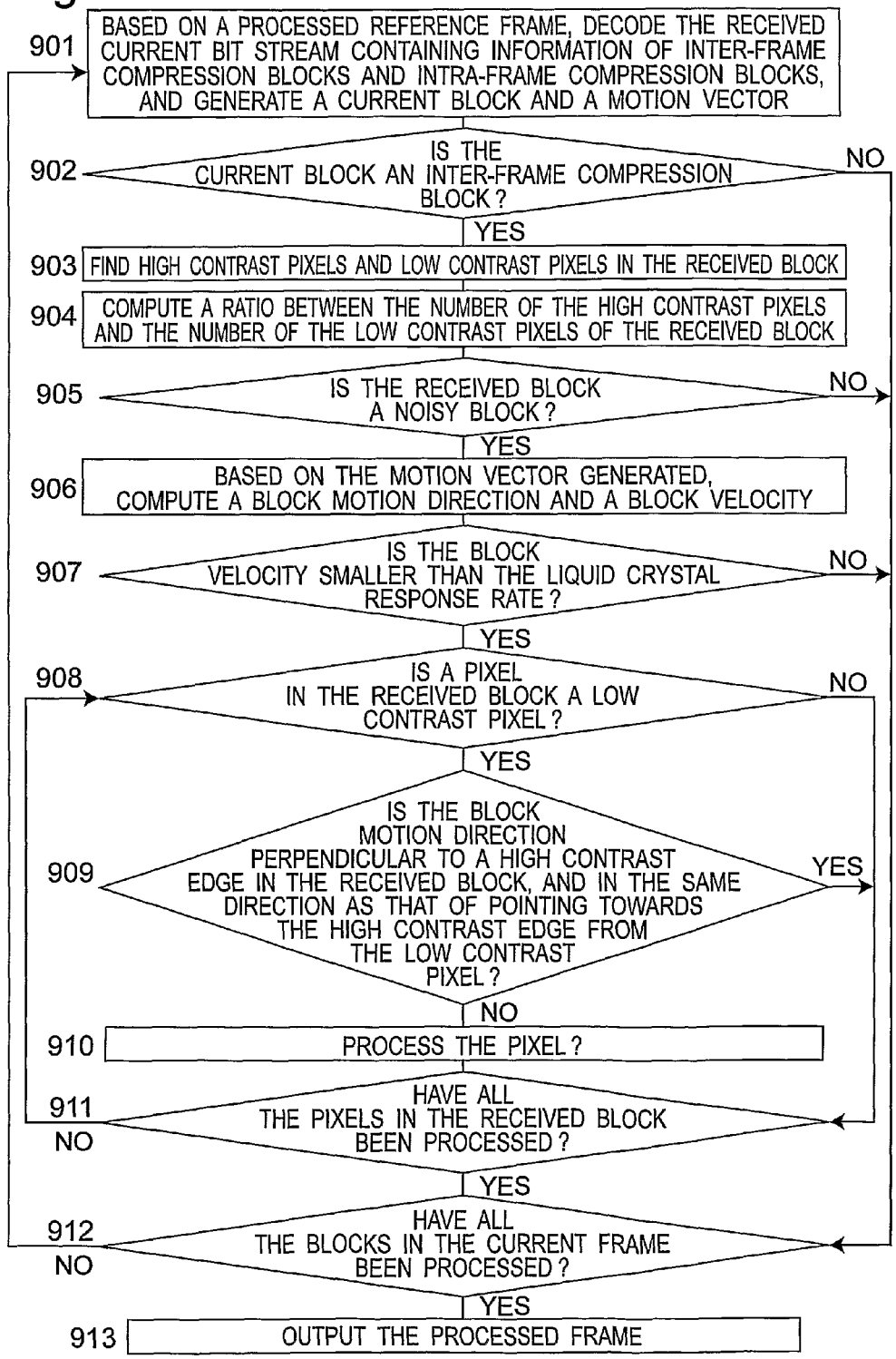

IMAGE PROCESSING APPARATUS, METHOD AND INTEGRATED CIRCUIT USED IN LIQUID CRYSTAL DISPLAY BY PROCESSING BLOCK VELOCITY OF NOISY BLOCKS

TECHNICAL FIELD

The invention relates to an image processing apparatus and method, and more particularly to an image processing apparatus and method adapted for use in a liquid crystal display.

BACKGROUND ART

As digital video becomes more common, images are usually encoded so as to increase transmission rate and the amount of data that can be stored, where decoding is conducted to convert the encoded data back to the original images.

In encoding, discrete cosine transform is usually used to transform spatial domain data into frequency domain data. Subsequently, the frequency domain data undergo quantization and entropy coding so as to eventually result in the encoded data. On the other hand, during decoding, the encoded data are first de-quantized, and then inverse discrete cosine transform is used to transform the de-quantized frequency domain data into spatial domain data. However, if the data are over-quantized during encoding, several false edges will appear near the real contrast edges of the images obtained after decoding. This is also known as ringing noise. When the false edges move with time, mosquito noise occurs.

Referring to FIG. 1, U.S. Pat. No. 5,920,356 discloses a post-processor 300, which is capable of removing mosquito noise in decoded images. The post-processor 300 receives a current frame $P_n$, and comprises a digital noise reduction unit 310, an artifact reduction unit 350, and a frame memory unit 301. The artifact reduction unit 350 includes an edge-detecting circuit 320, a control circuit 315, and a filter circuit 330. The frame memory unit 301 stores a processed reference frame $F_{n-1}$ therein.

First, the digital noise reduction unit 310 compares the difference between pixels of every block in current frame $P_n$ and corresponding pixels located at the same locations in the reference frame $F_{n-1}$, so as to generate a set of noise-reduced blocks. When the pixel difference is small, the pixel difference is regarded as noise and is attenuated. Otherwise, the pixel difference is regarded as a signal and is not attenuated.

The digital noise reduction unit 310 also compares the blocks located at the same locations in the two frames $P_n$, $F_{n-1}$, to determine a specific block is unchanged or not and to generate a corresponding replenished block flag $R_b$. When all of the pixel differences in a block are small, the block is regarded as a replenished block (i.e., unchanged block), and the replenished block flag $R_b$ is set. Otherwise, the block is regarded as a non-replenished block, and the replenished block flag $R_b$ is cleared.

After the digital noise reduction unit 310 finishes generating the noise-reduced blocks, with their replenished block flags $R_b$ correctly marked, the artifact reduction unit 350 proceeds to process the noise-reduced blocks.

For each noise-reduced block, the edge-detecting circuit 320 generates a set of edge pixel flags, an edge block flag $E_b$, and a texture block flag $T_b$. When a pixel is located on an edge, the pixel is regarded as an edge pixel, and the edge pixel flag thereof is set. Otherwise, the pixel is regarded as a non-edge pixel, and the edge pixel flag thereof is cleared. When a block has several edge pixels, the block is regarded as an edge block, and the edge block flag $E_b$ is set. Otherwise, the edge block flag $E_b$ is cleared.

When a pixel is located on a texture and is not an edge pixel, the pixel is regarded as a texture pixel. When a block has several texture pixels, the block is regarded as a texture block, and the texture block flag $T_b$ is set. Otherwise, the texture block flag $T_b$ is cleared.

After the edge block flag $E_b$ and the texture block flag $T_b$ of a noise-reduced block are correctly marked, the control circuit 315 proceeds to operate.

For a noise-reduced block, when the replenished block flag $R_b$ and the texture block flag $T_b$ are set, and the edge block flag $E_b$ is cleared (i.e., when the noise-reduced block is a replenished, texture, and non-edge block), the control circuit 315 electrically connects the digital noise reduction unit 310 to the frame memory unit 301 and to an output bus 302 of the post-processor 300 so as to output the noise-reduced block. Otherwise, the control circuit 315 electrically connects the filter circuit 330 to the frame memory unit 301 and to the output bus 302 of the post-processor 300 so as to output filtered result of the noise-reduced block.

Based on the edge pixel flag of each pixel in the noise-reduced block, and the edge pixel flags of pixels located within a particular range around that pixel, the filter circuit 330 classifies that pixel into one of an edge pixel, an edge boundary pixel, and a shade pixel. When the pixel is an edge pixel, the filter circuit 330 does not filter the pixel. When the pixel is an edge boundary pixel, the filter circuit 330 performs one-dimensional filtering on the pixel. Further, when the pixel is a shade pixel, the filter circuit 330 performs two-dimensional filtering on the pixel.

For a liquid-crystal display, when its liquid crystal response time is too long, after-images will be generated at the edges of moving objects so as to cover the mosquito noise. In addition, when the moving rate of the images is faster than the response rate of the liquid crystals, the image data cannot be displayed. Since the conventional post-processor 300 does not take into account the response time of the liquid crystal display, filtering is still performed on the mosquito noise that are covered by the after-images and that cannot be displayed, thereby slowing down the processing speed.

DISCLOSURE OF INVENTION

Therefore, the object of the present invention is to provide an image processing apparatus that considers the characteristics of liquid crystals in order to increase processing speed thereof.

Another object of the present invention is to provide an image processing method that considers the characteristics of liquid crystals in order to increase processing speed thereof.

Yet another object of the present invention is to provide an integrated circuit that considers the characteristics of liquid crystals in order to increase processing speed thereof.

Therefore, according to one aspect of the present invention, there is provided an image processing apparatus that is adapted for use in a liquid crystal display, and that is adapted to receive a decoded current frame containing a plurality of blocks. The apparatus includes a memory unit, a computing unit, and a processing unit.

The memory unit stores at least one processed reference frame therein.

The computing unit determines which received blocks are noisy blocks, finds a most similar reference block for each noisy block from the reference frame stored in the memory unit, and generates a block velocity for each noisy block.

Based on the block velocity generated by the computing unit for each noisy block, among the received blocks, the processing unit processes pixels that are in the noisy blocks with block velocities smaller than a liquid crystal response rate of the liquid crystal display and that are not covered by after-images, and outputs the processed pixels to the memory unit for storage therein. The processing unit directly outputs the rest of the received blocks to the memory unit for storage therein.

According to another aspect of the present invention, there is provided an image processing method for use in a liquid crystal display including the steps of:

determining which blocks in a decoded current frame are noisy blocks;

finding, in a processed reference frame, a most similar reference block for each noisy block, and generating a block velocity for each noisy block; and processing pixels that are in the noisy blocks having block velocities smaller than the liquid crystal response rate of the liquid crystal display, and that are not covered by after-images.

According to yet another aspect of the present invention, there is provided an integrated circuit that receives the decoded current frame, and that includes the aforesaid memory unit, computing unit, and processing unit.

BRIEF DESCRIPTION OF DRAWINGS

Other features and advantages of the present invention will become apparent in the following detailed description of the preferred embodiments with reference to the accompanying drawings, of which:

FIG. 4 is a schematic diagram, illustrating how a reference block is found according to the first preferred embodiment;

FIG. 7 is a flow chart of an image processing method used in the second preferred embodiment.

BEST MODE FOR CARRYING OUT THE INVENTION

Before the present invention is described in greater detail, it should be noted herein that like elements are denoted by the same reference numbers throughout the disclosure.

The present invention is suitable for use in a liquid crystal display.

Figure 1:
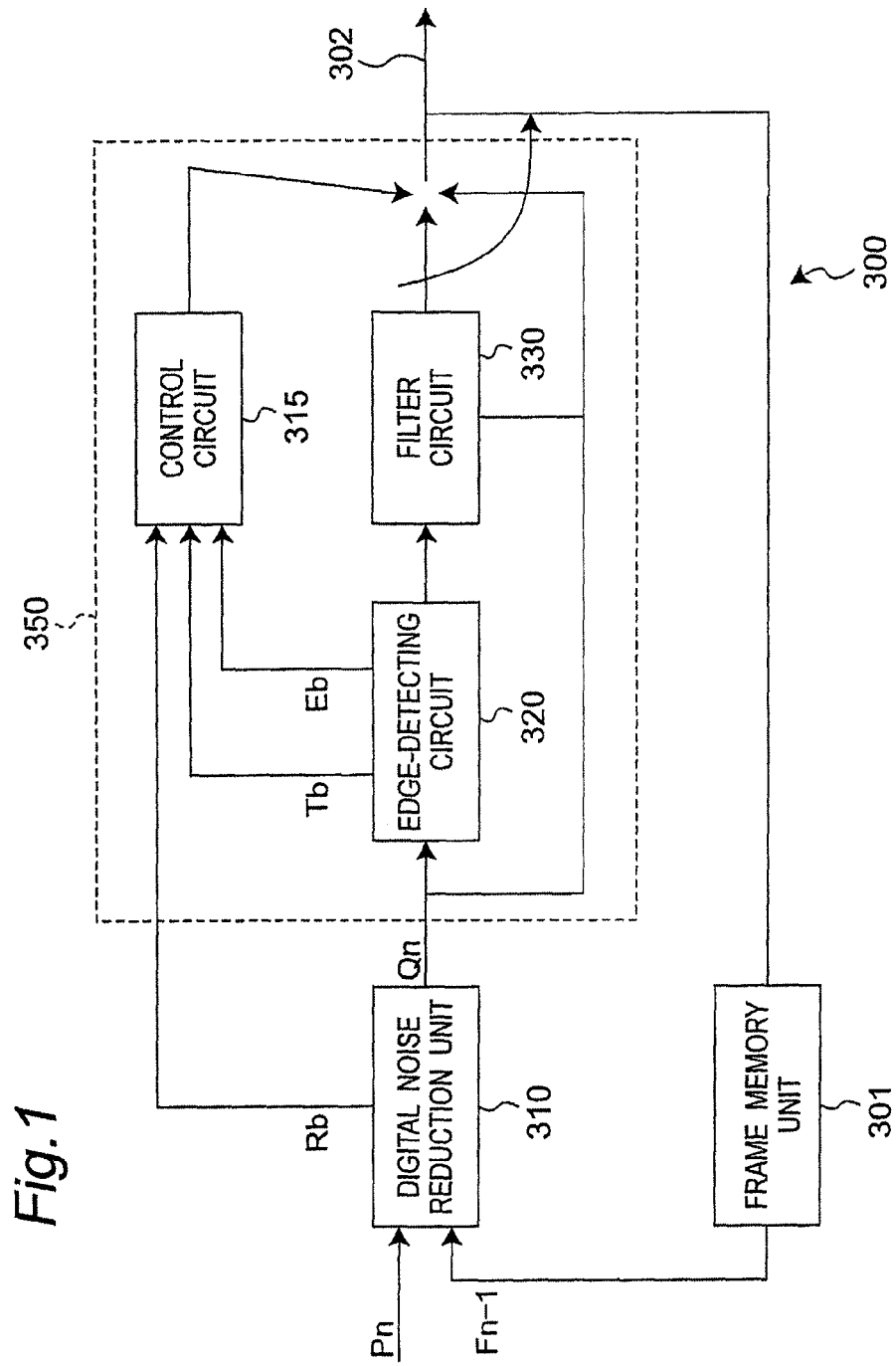
FIG. 1 is a block diagram of a conventional post-processor.
Figure 2:
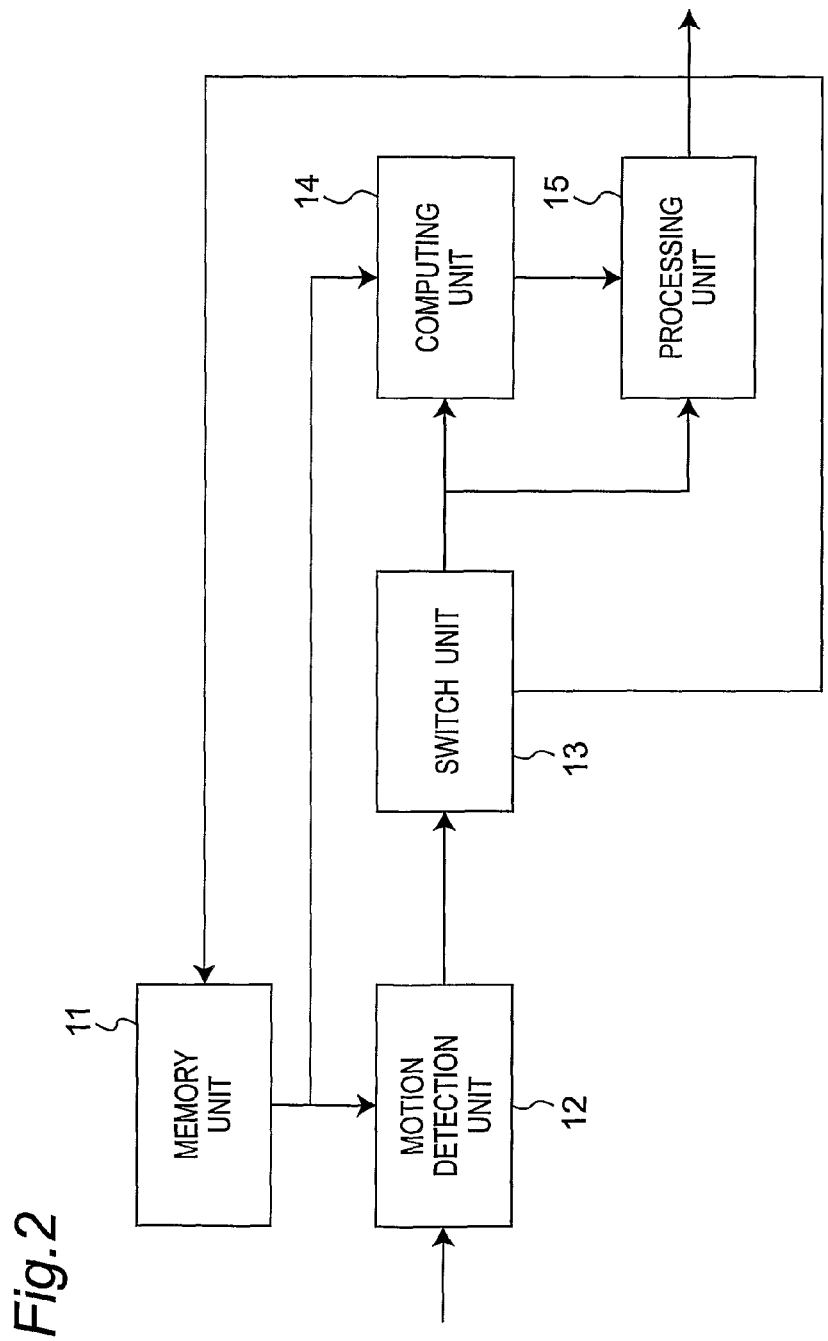
FIG. 2 is a block diagram of the first preferred embodiment of an image processing apparatus according to the present invention.

Referring to FIG. 2, the first preferred embodiment of an image processing apparatus according to the present invention receives a decoded current frame, and includes a memory unit 11, a motion detection unit 12, a switch unit 13, a computing unit 14, and a processing unit 15.

The memory unit 11 stores at least one processed reference frame therein.

Figure 3:
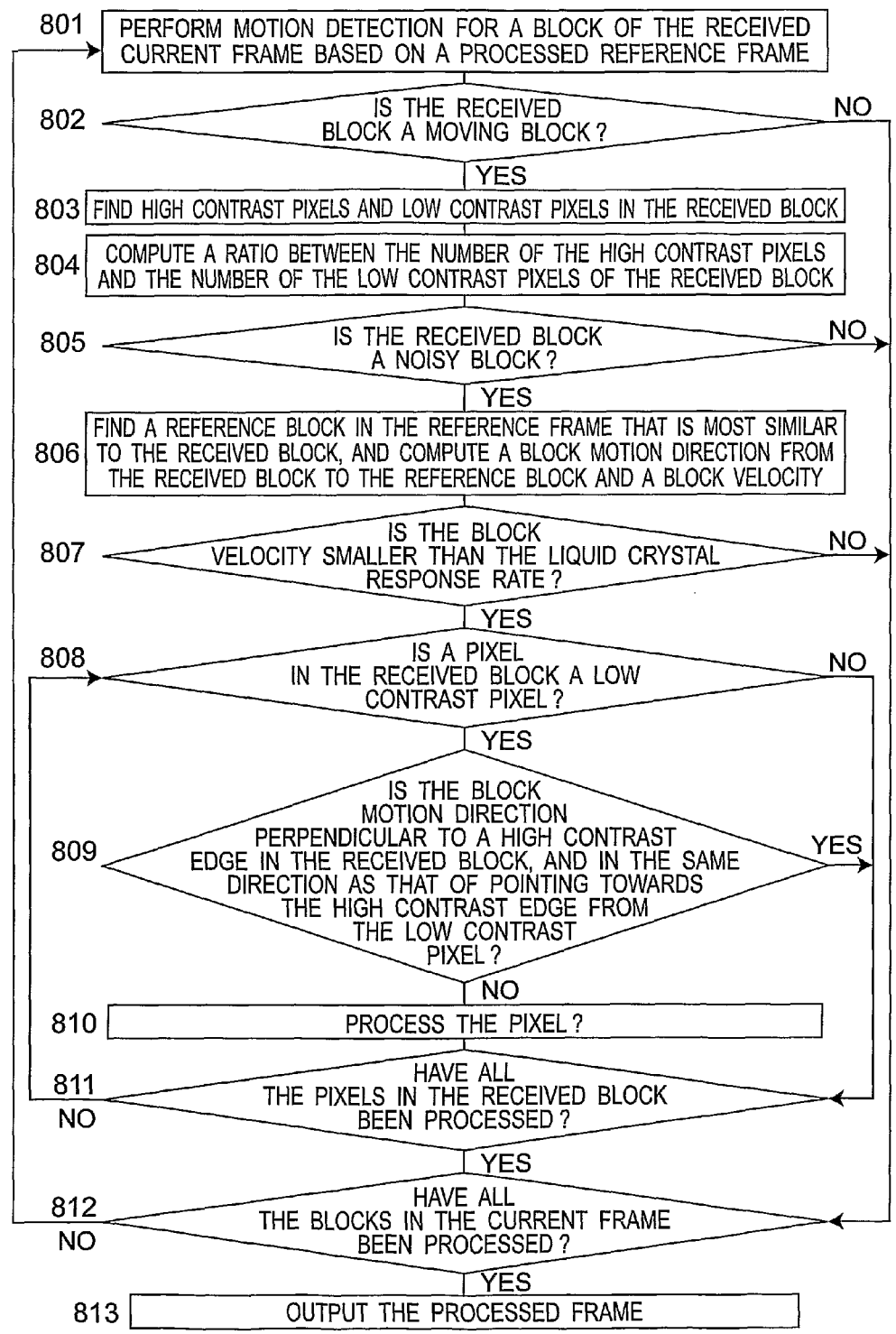
FIG. 3 is a flow chart of an image processing method used in the first preferred embodiment.

As shown in FIG. 2 and FIG. 3, an image processing method used in this embodiment includes the following steps:

In step 801, the motion detection unit 12 performs motion detection for a block (also referred to as a received block) of the received current frame based on the reference frame stored in the memory unit 11, so as to generate a moving block flag. When the difference between a received block and a corresponding block located at the same location in the reference frame is large, the received block is considered to be a moving block, and the moving block flag is set. Otherwise, the received block is considered to be a still block, and the moving block flag is cleared.

In step 802, the switch unit 13 determines whether a received block finishing motion detection is a moving block, based on the moving block flag generated by the motion detection unit 12. If yes, the switch unit 13 transmits the received block to the computing unit 14 and the processing unit 15, and the flow proceeds to step 803. If not, the switch unit 13 directly outputs the received block, and the flow proceeds to step 812.

In step 803, the computing unit 14 performs Laplacian operation on each pixel in the received moving block so as to generate a set of pixel flags. Examples of the Laplacian operators are as follows:

$$\begin{bmatrix} 0 & -1 & 0 \\ -1 & 4 & -1 \\ 0 & -1 & 0 \end{bmatrix} \text{ or } \begin{bmatrix} -1 & -1 & -1 \\ -1 & 8 & -1 \\ -1 & -1 & -1 \end{bmatrix},$$

but should not be limited thereto.

When the Laplacian value of a pixel is greater than a high contrast threshold, the pixel is considered to be a high contrast pixel, and the pixel flag thereof is set to "H". On the other hand, when the Laplacian value of a pixel is smaller than a low contrast threshold, the pixel is considered to be a low contrast pixel, and the pixel flag thereof is set to "L". The low contrast threshold can be set to be ⅛ of the high contrast threshold, but is not limited thereto.

In step 804, the computing unit 14 computes a ratio between the number of the high contrast pixels and that of the low contrast pixels of the received block, i.e., a moving block, based on the set of pixel flags generated in step 803, so as to generate a noisy block flag. When the ratio between the number of the high contrast pixels and that of the low contrast pixels of a received block is greater than a ratio threshold, the received block is considered to be a noisy block, and the noisy block flag thereof is set. Otherwise, the noisy block flag is cleared. The ratio threshold can be determined by the width of mosquito noise near a high contrast edge (composed of a plurality of the high contrast pixels), or by the distance between two adjacent high contrast edges. For instance, when the distance between two adjacent high contrast edges is relatively large, the ratio threshold is set to be smaller than an initial value, because ringing degree of thicker lines is relatively weak. The initial value can be set using the average distance between adjacent high contrast edges of a previous frame.

In step 805, the processing unit 15 determines whether the received block is a noisy block based on the noisy block flag generated by the computing unit 14. If yes, the flow proceeds to step 806. If not, the processing unit 15 does not process the received block, and the flow jumps to step 812.

In step 806, based on the block that is in the reference frame stored in the memory unit 11 and is co-located with the received noisy block, the computing unit 14 compares the noisy block with all the blocks in the reference frame that are displaced from the corresponding block within a particular range, so as to find a reference block in the reference frame that is most similar to the noisy block. Based on a motion vector from the noisy block to the reference block, the pixel pitch of the liquid crystal display, and the time difference between the display of the current frame and the reference frame, the computing unit 14 further generates a block motion direction (i.e., the direction of the motion vector) from the noisy block to the reference block and its block velocity. The block velocity is computed as follows:

$$V_b = \frac{\sqrt{x^2 + y^2} \cdot D_p}{\Delta t}$$

where $V_b$ is the block velocity, (x,y) is the motion vector, $D_p$ is the pixel pitch of the liquid crystal display, and $\Delta t$ is the time difference between the display of the current frame and the reference frame.

In this embodiment, the comparison scheme of the computing unit 14 is based on the set of pixel flags of the noisy block, where the mean of absolute difference (MAD) between the high contrast pixels in the noisy block and the corresponding pixels located at the same locations in every displaced block within the particular range is computed, with lower MAD value representing higher similarity.

Figure 4:
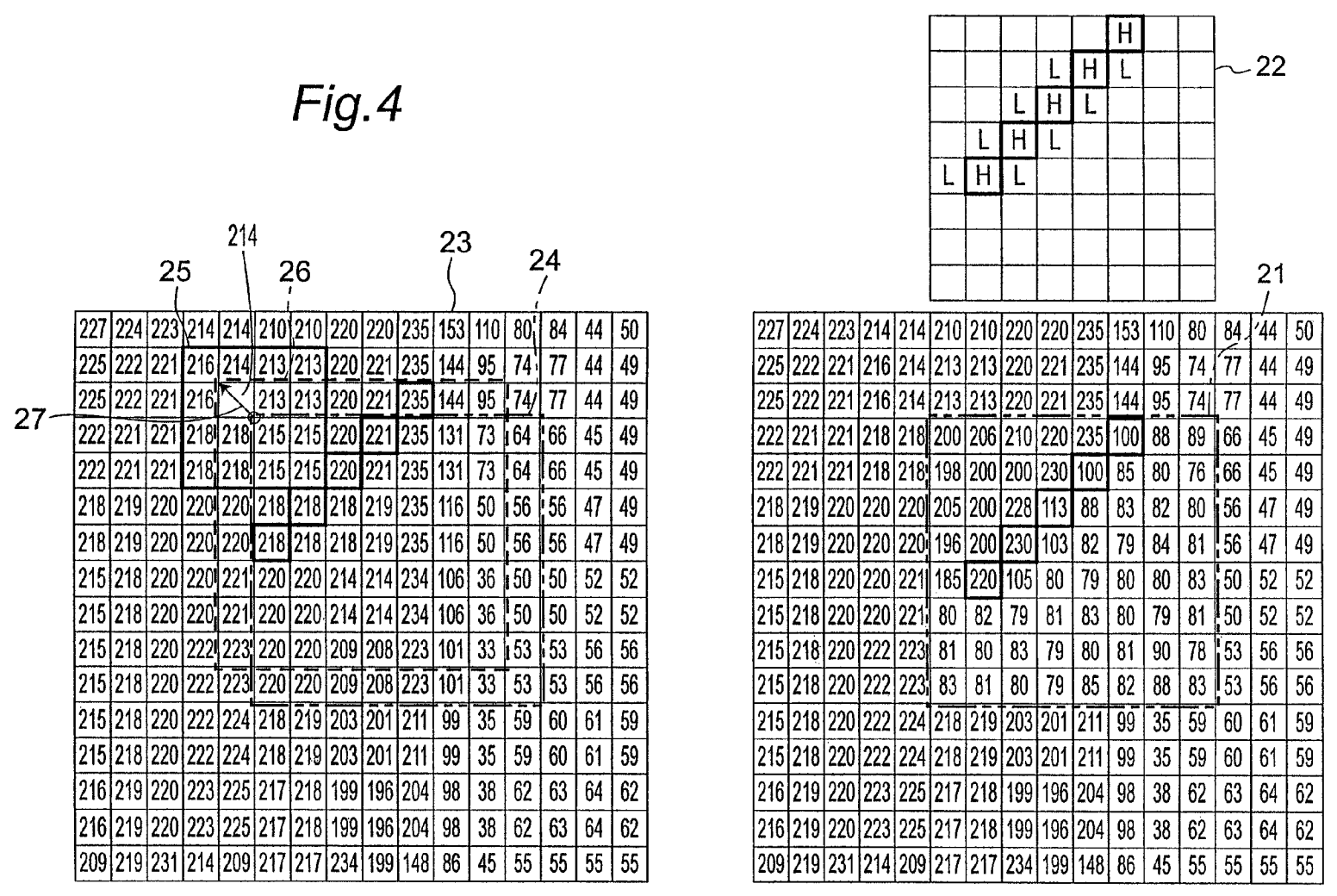

A simple example is presented hereinbelow for illustration. As shown in FIG. 4, each number in the square represents a pixel value. The computing unit 14 takes the left top corner of the corresponding block 24 as the origin, and based on the set of pixel flags 22, computes MAD values between the received block 21 and each of the blocks in the reference frame 23 which are displaced from the corresponding block 24 and whose left top corners fall within a 4×4 pixel range 25 centered at the origin. Here, MAD values are only computed for pixels corresponding to those having the set of pixel flags 22 set to "H". Let us assume that the smallest MAD value is obtained for the block whose left top corner is located at (−1, −1), i.e., this block is the reference block 26, and the vector (−1, −1) is the motion vector 27.

Referring back to FIG. 2 and FIG. 3, in step 807, based on the block velocity generated by the computing unit 14 and a pre-calculated liquid crystal response rate, the processing unit 15 determines whether the block velocity of the noisy block is smaller than the liquid crystal response rate (i.e., determines whether the received block can be displayed). If yes, the flow proceeds to step 808. If no, the processing unit 15 does not process the received block, and the flow proceeds to step 812. The liquid crystal response rate is equal to the pixel pitch of the liquid crystal display divided by the liquid crystal response time.

A simple example is shown hereinbelow for illustration. For a liquid crystal display with a pixel pitch of 0.414 mm and a liquid crystal response time of 25 ms, the liquid crystal response rate is 0.414/0.025=16.56 mm/s. For a liquid crystal display with a pixel pitch of 0.414 mm and a liquid crystal response time of 16 ms, the liquid crystal response rate is 0.414/0.016=25.875 mm/s. For a normal National Television System Committee (NTSC) television system, the time difference between the display of the current frame and the reference frame is 1/29.97 seconds. For a liquid crystal display with a pixel pitch of 0.414 mm, when the motion vector is (−1, −1), the block velocity is $$\frac{\sqrt{(-1)^2 + (-1)^2} \cdot 0.414}{1/29.97} = 17.55 \text{ mm/s}.$$

Since 17.55>16.56, a block with a motion vector of (−1, −1) cannot be displayed on a liquid crystal display with a liquid crystal response time of 25 ms. On the other hand, since 17.55<25.875, a block with a motion vector of (−1, −1) can be displayed on a liquid crystal display with a liquid crystal response time of 16 ms.

In step 808, based on the pixel flags generated by the computing unit 14, the processing unit 15 determines whether a pixel in the noisy block is a low contrast pixel. If yes, the flow proceeds to step 809. If no, the processing unit 15 does not process the pixel, and the flow proceeds to step 811.

In step 809, based on the pixel flags and the block motion direction generated by the computing unit 14, the processing unit 15 determines whether the block motion direction is perpendicular to some high contrast edge in the noisy block, and is in the same direction as that of pointing towards the high contrast edge from the low contrast pixel (i.e., to determine whether the pixel will be covered by the after-images). If yes, the processing unit 15 does not process the pixel, and the flow proceeds to step 811. Otherwise, the flow jumps to step 810.

Figure 5:
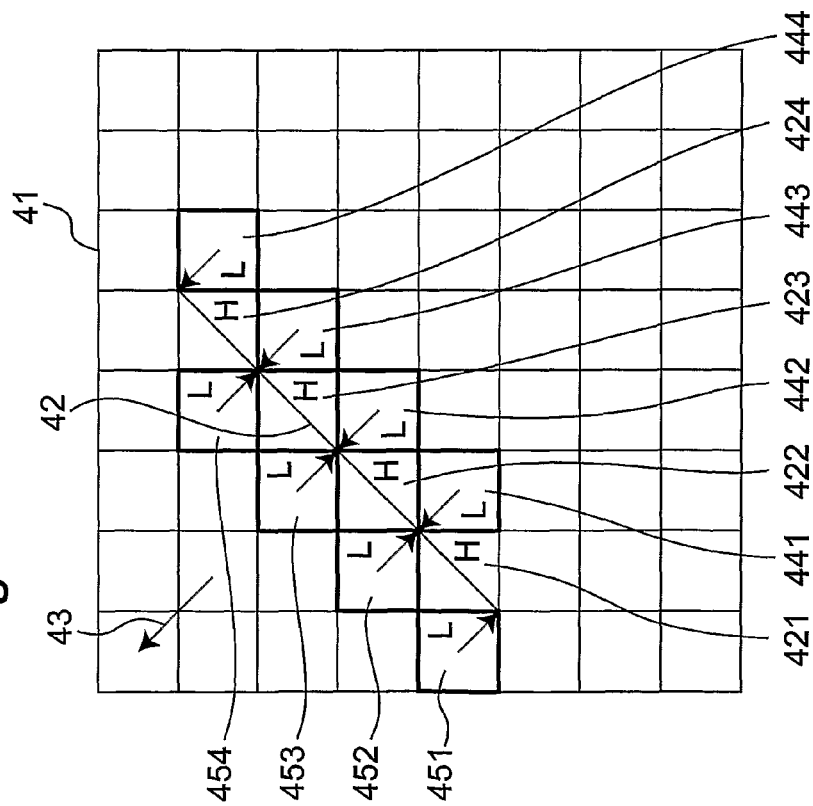
FIG. 5 is a schematic diagram, illustrating how to determine whether a low contrast pixel is to be processed according to the first preferred embodiment.

A simple example is provided hereinbelow for illustration. As shown in FIG. 5, the high contrast pixels 421~424 (whose pixel flags are marked "H") in the received block 41 compose a high contrast edge 42. The block motion direction 43 is perpendicular to the high contrast edge 42. The direction of pointing towards the high contrast edge 42 from the low contrast pixels 441~444 (whose pixel flags are marked "L") is the same as the block motion direction 43, and therefore the processing unit 15 does not process the low contrast pixels 441~444. On the other hand, the direction of pointing towards the high contrast edge 42 from the low contrast pixels 451~454 (whose pixel flags are marked "L") is opposite to the block motion direction 43. The processing unit 15 processes the low contrast pixels 451~454. Flag blocks 46 are marked to indicate whether pixels need to be processed. If yes, flags in the flag block 46 corresponding to the pixels that are required to be processed are set to 1. Otherwise, the flags are set to 0.

Referring to FIG. 2 and FIG. 3, in step 810, the processing unit 15 processes the pixel. In this embodiment, the processing scheme performed by the processing unit 15 on a pixel is filtering. However, other processing schemes, such as interpolation, can also be performed on a pixel.

In step 811, it is determined whether all the pixels in the block received by the processing unit 15 have been processed. If yes, the processed block is outputted, and the flow proceeds to step 812. If no, the flow jumps back to step 808.

In step 812, it is determined whether all the blocks in the current frame received by the motion detection unit 12 have been processed. If yes, the flow proceeds to step 813. If no, the flow jumps back to step 801.

In step 813, the processed frame is outputted, and is stored in the memory unit 11.

It should be noted herein that the motion detection unit 12, the switch unit 13, and steps 801, 802 are designed to reduce the amount of computations required to be performed by the computing unit 14. Without the units 12, 13, and steps 801, 802, the objects of the present invention can still be achieved.

Motion Picture Expert Group (MPEG) is one of the international standards for motion picture compression. There are two block compression schemes in MPEG, with one being "intra-frame" compression, and the other being "inter-frame" compression. When intra-frame compression is used, the current block undergoes discrete cosine transform, quantization, and encoding without referring to blocks in other frames. When inter-frame compression is used, the block in a previous frame that is most similar to the current block is found, subtraction is performed on corresponding pixel values between the two blocks, and discrete cosine transform, quantization, and encoding is then performed on the subtraction result. The difference between the origins at the left top corners of the two blocks is recorded as the motion vector.

Since an MPEG bit stream contains motion vector information, the first preferred embodiment can be combined with a decoding device so as to obtain the motion vector during the image decoding process, thereby avoiding the re-calculation of motion vectors after the decoding process is completed.

Figure 6:
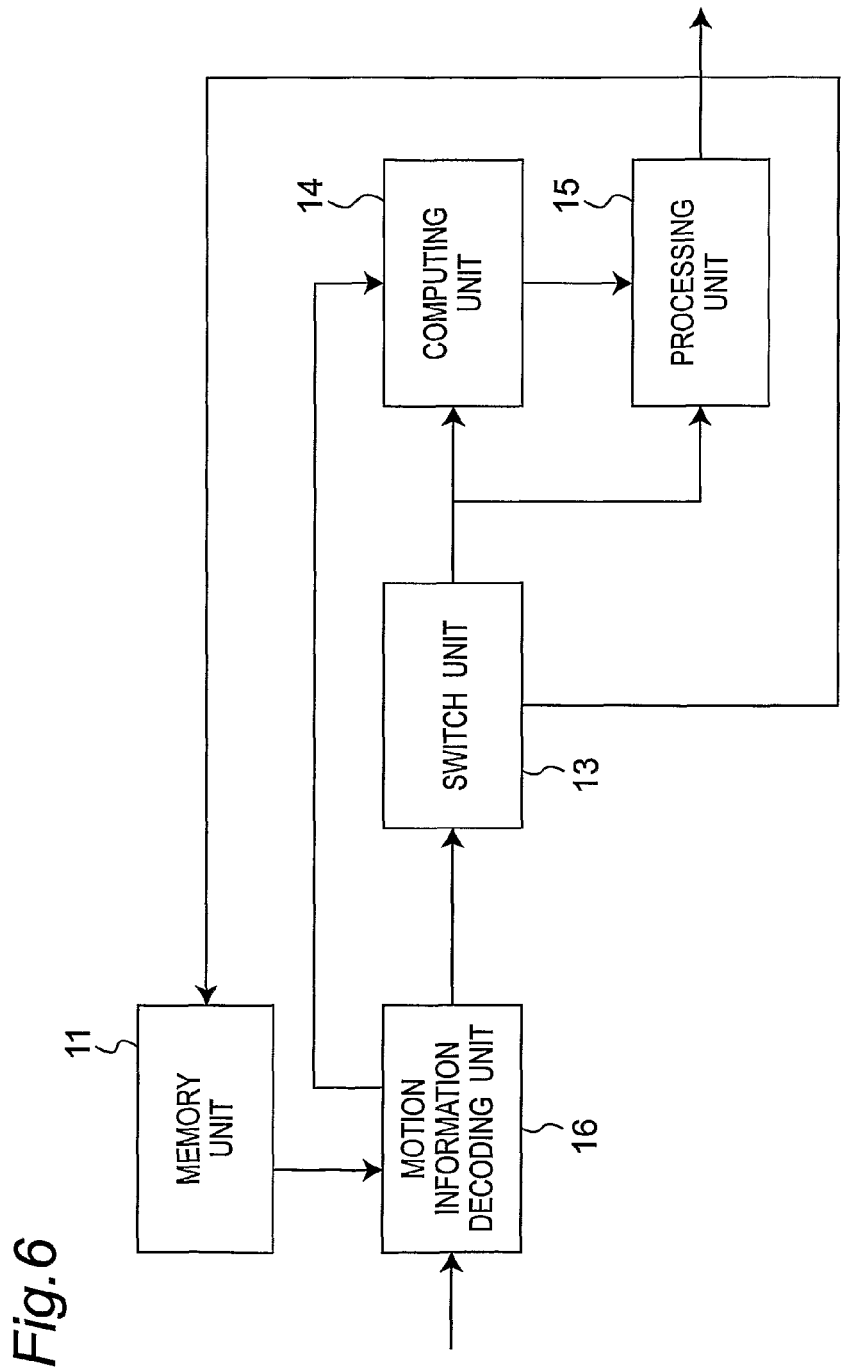
FIG. 6 is a block diagram of the second preferred embodiment of an image processing apparatus according to the present invention.

Referring to FIG. 6, the second preferred embodiment of an image processing apparatus according to the present invention receives a current bit stream that contains information of inter-frame compression blocks and intra-frame compression blocks, and includes a memory unit 11, a motion information decoding unit 16, a switch unit 13, a computing unit 14, and a processing unit 15.

The memory unit 11 stores at least one processed reference frame therein.

Referring to FIG. 6 and FIG. 7, an image processing method used in this embodiment includes the following steps:

In step 901, based on the reference frame stored in the memory unit 11, the motion information decoding unit 16 decodes the received current bit stream so as to generate a current block, an inter-frame compression block flag, and a motion vector. When the current block is an inter-frame compression block, the inter-frame compression block flag is set, and when the current block is an intra-frame compression block, the inter-frame compression block flag is cleared.

In step 902, based on the inter-frame compression block flag generated by the motion information decoding unit 16, the switch unit 13 determines whether the current block is an inter-frame compression block. If yes, the switch unit 13 transmits the current block to the computing unit 14 and the processing unit 15, and the flow proceeds to step 903. If no, the switch unit 13 directly outputs the current block, and the flow jumps to step 912.

Since steps 903~905 are respectively identical to steps 803~805 in the first preferred embodiment, further details of the same are omitted herein for the sake of brevity.

In step 906, based on the motion vector decoded by the motion information decoding unit 16, the pixel pitch of the liquid crystal display, and the time difference between display of the current frame and the reference frame, the computing unit 14 generates a block motion direction of the inter-frame compression block and its block velocity.

Since steps 907~913 are respectively identical to steps 807~813, further details of the same are omitted herein for the sake of brevity.

It should be noted herein that the switch unit 13, the computing unit 14, and the processing unit 15 of this embodiment can be sold independently. At this time, an external decoding device can be directly used to decode the current block, the inter-frame compression block flag, and the motion vector.

An integrated circuit according to the present invention receives the decoded current frame, and includes the memory unit 11, the motion detection unit 12, the switch unit 13, the computing unit 14 and the processing unit 15 of the first preferred embodiment.

Another integrated circuit according to the present invention receives the current bit stream that contains information of inter-frame compression blocks and intra-frame compression blocks, and includes the memory unit 11, the motion information decoding unit 16, the switch unit 13, the computing unit 14, and the processing unit 15 of the second preferred embodiment.

In sum, by considering the characteristics of the liquid crystal response time of a liquid crystal display, the present invention does not process those mosquito noise that are covered by after-images and that cannot be displayed, thereby increasing the image processing speed as compared to the post-processor in the prior art.

While the present invention has been described in connection with what are considered the most practical and preferred embodiments, it is understood that this invention is not limited to the disclosed embodiments but is intended to cover various arrangements included within the spirit and scope of the broadest interpretation and equivalent arrangements.

INDUSTRIAL APPLICABILITY

The present invention is applicable to an image processing apparatus.

The invention claimed is:

1. An image processing method adapted to be used in a liquid crystal display, comprising the steps of:
    (A) determining which blocks in a decoded current frame are noisy blocks;
    (B) finding, in a processed reference frame, a most similar reference block for each noisy block, and generating a block velocity for each noisy block; and
    (C) processing pixels that are in the noisy blocks having block velocities smaller than the liquid crystal response rate of the liquid crystal display, and that are not covered by after-images; wherein the liquid crystal response rate is equal to the pixel pitch of the liquid crystal display divided by a liquid crystal response time of the liquid crystal display, the block velocity being computed as follows:

$$V_b = \frac{\sqrt{x^2 + y^2} \cdot D_p}{\Delta_t}$$

where $V_b$ is the block velocity, (x,y) is a motion vector of pointing towards the reference block from the noisy block, $D_p$ is the pixel pitch of the liquid crystal display, and $\Delta t$ is the time difference between the display of the current frame and the reference frame.

2. The image processing method as claimed in claim 1, wherein step (A) is performed based on a ratio between the number of high contrast pixels and that of low contrast pixels in a block, a block having a large ratio being considered to be a noisy block, the high contrast pixels referring to pixels with large Laplacian values, the low contrast pixels referring to pixels with small Laplacian values.

3. The image processing method as claimed in claim 1, wherein step (B) is performed based on a corresponding block in the reference frame that is located at the same location as the noisy block, and by comparing the noisy block with all the blocks in the reference frame that are within a particular range of distance from the corresponding block, so as to find the most similar reference block.

4. The image processing method as claimed in claim 3, wherein in step (B), the mean of absolute difference between high contrast pixels in the noisy block and the corresponding pixels located at the same locations in every block within the particular range of distance is computed with lower mean of absolute difference representing higher similarity, the high contrast pixels referring to pixels with large Laplacian values.

5. The image processing method as claimed in claim 1, wherein if the direction of pointing towards the reference block from the noisy block is perpendicular to a high contrast edge of the noisy block and is opposite to the direction of pointing towards the high contrast edge from a low contrast pixel, the low pixel is not covered by the after-images, the low contrast pixel referring to a pixel with a low Laplacian value.

6. The image processing method as claimed in claim 1, wherein the pixels are processed by filtering.

7. The image processing method as claimed in claim 1, further comprising, prior to step (A), the step of: performing motion detection on the current frame based on the reference frame, and determining moving blocks in the current frame, where the moving blocks serve as priority subjects for determining the noisy blocks in step (A).

8. An image processing apparatus adapted for use in a liquid crystal display, and for receiving a decoded current frame, the current frame including a plurality of blocks, said image processing apparatus comprising:
  a memory unit having at least one processed reference frame stored therein;
  a computing unit for determining which received blocks are noisy blocks, for finding a most similar reference block for each noisy block from the reference frame stored in said memory unit, and for generating a block velocity for each noisy block; and
  a processing unit for processing, among the received blocks and based on the block velocities generated by said computing unit, pixels that are in the noisy blocks having block velocities smaller than a liquid crystal response rate of the liquid crystal display and that are not covered by after-images, and for outputting processed pixels to said memory unit for storage therein, said processing unit directly outputting the other blocks to said memory unit for storage therein; wherein the liquid crystal response rate is equal to the pixel pitch of the liquid crystal display divided by a liquid crystal response time of the liquid crystal display, the block velocity being computed by said computing unit as follows:

$$V_b = \frac{\sqrt{x^2 + y^2} \cdot D_p}{\Delta_t}$$

where $V_b$ is the block velocity, (x,y) is a motion vector of pointing towards the reference block from the noisy block, $D_p$ is the pixel pitch of the liquid crystal display, and $\Delta t$ is the time difference between the display of the current frame and the reference frame.

9. The image processing apparatus as claimed in claim 8, wherein said computing unit determines the noisy blocks based on a ratio between the number of high contrast pixels and that of low contrast pixels in a block, a block having a large ratio being considered to be a noisy block, the high contrast pixels referring to pixels with large Laplacian values, the low contrast pixels referring to pixels with small Laplacian values.

10. The image processing apparatus as claimed in claim 8, wherein said computing unit based on a corresponding block in the reference frame that is located at the same location as the noisy block, compares the noisy block with all the blocks in the reference frame that are within a particular range of distance from the corresponding block, so as to find the most similar reference block.

11. The image processing apparatus as claimed in claim 10, wherein said computing unit computes the mean of absolute difference between high contrast pixels in the noisy block and the corresponding pixels located at the same locations in every block within the particular range of distance with lower mean of absolute difference representing higher similarity, the high contrast pixels referring to pixels with large Laplacian values.

12. The image processing apparatus as claimed in claim 8, wherein if the direction of pointing towards the reference block from the noisy block is perpendicular to a high contrast edge of the noisy block and is opposite to the direction of pointing towards the high contrast edge from a low contrast pixel, the low pixel is not covered by the after-images, the low contrast pixel referring to a pixel with a low Laplacian value.

13. The image processing apparatus as claimed in claim 8, wherein said processing unit processed the pixels by filtering.

14. The image processing apparatus as claimed in claim 8, further comprising a motion detection unit and a switch unit, said motion detection unit performing motion detection on the current frame based on the reference frame stored in said memory unit and determining moving blocks in the current frame, said switch unit transmitting the moving blocks detected by said motion detection unit to said computing unit and said processing unit, and directly outputting the rest of the blocks other than the moving blocks to said memory unit for storage therein.

15. An integrated circuit adapted for use in a liquid crystal display, and for receiving a decoded current frame, the current frame including a plurality of blocks, said integrated circuit comprising:
  a memory unit having at least one processed reference frame stored therein;
  a computing unit for determining which received blocks are noisy blocks, for finding a most similar reference block for each noisy block from the reference frame stored in said memory unit, and for generating a block velocity for each noisy block; and
  a processing unit for processing, among the received blocks and based on the block velocities generated by said computing unit, pixels that are in the noisy blocks having block velocities smaller than a liquid crystal response rate of the liquid crystal display and that are not covered by after-images, and for outputting processed pixels to said memory unit for storage therein, said processing unit directly outputting the other blocks to said memory unit for storage therein; wherein the liquid crystal response rate is equal to the pixel pitch of the liquid crystal display divided by a liquid crystal response time of the liquid crystal display, the block velocity being computed by said computing unit as follows:

$$V_b = \frac{\sqrt{x^2 + y^2} \cdot D_p}{\Delta_t}$$

where $V_b$ is the block velocity, (x,y) is a motion vector of pointing towards the reference block from the noisy block, $D_p$ is the pixel pitch of the liquid crystal display, and $\Delta t$ is the time difference between the display of the current frame and the reference frame.

16. The integrated circuit as claimed in claim 15, wherein said computing unit determines the noisy blocks based on a ratio between the number of high contrast pixels and that of low contrast pixels in a block, a block having a large ratio being considered to be a noisy block, the high contrast pixels referring to pixels with large Laplacian values, the low contrast pixels referring to pixels with small Laplacian values.

17. The integrated circuit as claimed in claim 15, wherein said computing unit based on a corresponding block in the reference frame that is located at the same location as the noisy block, compares the noisy block with all the blocks in the reference frame that are within a particular range of distance from the corresponding block, so as to find the most similar reference block.

18. The integrated circuit as claimed in claim 17, wherein said computing unit computes the mean of absolute difference between high contrast pixels in the noisy block and the corresponding pixels located at the same locations with the high contrast pixels in every block within the particular range of distance with lower mean of absolute difference representing higher similarity, the high contrast pixels referring to pixels with large Laplacian values.

19. The integrated circuit as claimed in claim 15, wherein if the direction of pointing towards the reference block from the noisy block is perpendicular to a high contrast edge of the noisy block and is opposite to the direction of pointing towards the high contrast edge from a low contrast pixel, the low pixel is not covered by the after-images, the low contrast pixel referring to a pixel with a low Laplacian value.

20. The integrated circuit as claimed in claim 15, wherein said processing unit processes the pixels by filtering.

21. The integrated circuit as claimed in claim 15, further comprising a motion detection unit and a switch unit, said motion detection unit performing motion detection on the current frame based on the reference frame stored in said memory unit and determining moving blocks in the current frame, said switch unit transmitting the moving blocks detected by said motion detection unit to said computing unit and said processing unit, and directly outputting the rest of the blocks other than the moving blocks to said memory unit for storage therein.

* * * * *